(12) United States Patent
Xing

(10) Patent No.: US 10,485,184 B2
(45) Date of Patent: Nov. 26, 2019

(54) STACK PLANTER RESERVOIR

(71) Applicant: Yaping Xing, Live Oak, FL (US)

(72) Inventor: Yaping Xing, Live Oak, FL (US)

(*) Notice: Subject to any disclaimer, the term of this patent is extended or adjusted under 35 U.S.C. 154(b) by 161 days.

(21) Appl. No.: 15/689,254

(22) Filed: Aug. 29, 2017

(65) Prior Publication Data

US 2017/0354096 A1 Dec. 14, 2017

Related U.S. Application Data

(63) Continuation-in-part of application No. 29/551,370, filed on Jan. 13, 2016, now Pat. No. Des. 795,738.

(51) Int. Cl.
| | | |
|---|---|---|
| *A01G 27/00* | (2006.01) | |
| *A01G 9/02* | (2018.01) | |
| *A01G 25/00* | (2006.01) | |
| *A01G 31/00* | (2018.01) | |
| *A01G 31/06* | (2006.01) | |

(52) U.S. Cl.
CPC ............ *A01G 9/023* (2013.01); *A01G 9/028* (2013.01); *A01G 25/00* (2013.01); *A01G 27/005* (2013.01); *A01G 31/06* (2013.01); *A01G 2031/006* (2013.01)

(58) Field of Classification Search
CPC ........ A01G 9/023; A01G 9/028; A01G 25/00; A01G 27/00; A01G 27/005; A01G 31/06; A01G 2031/006
USPC .......................................................... 47/79
See application file for complete search history.

(56) References Cited

U.S. PATENT DOCUMENTS

| | | | | |
|---|---|---|---|---|
| 3,686,791 A | * | 8/1972 | Mills | E04C 1/395 47/83 |
| 4,174,589 A | * | 11/1979 | Daharsh | A01G 9/02 4/300 |
| 4,779,378 A | * | 10/1988 | Mason, Jr. | A01G 9/023 47/83 |
| 5,404,672 A | * | 4/1995 | Sanderson | A01G 9/023 47/39 |
| 5,782,453 A | * | 7/1998 | Tuzza | A47G 33/12 248/519 |
| 6,085,461 A | * | 7/2000 | Brisson | A47G 7/085 47/78 |
| 6,125,579 A | * | 10/2000 | Pavelka | A01G 27/02 47/79 |
| 6,612,073 B1 | * | 9/2003 | Powell | A01G 9/023 47/65.5 |
| 7,043,877 B1 | * | 5/2006 | Jensen | A01G 9/023 47/82 |
| D752,478 S | * | 3/2016 | Cudmore | D11/152 |

(Continued)

FOREIGN PATENT DOCUMENTS

WO   WO-2008025103 A1 * 3/2008 ............. A01G 9/023

*Primary Examiner* — Claude J Brown

(57) ABSTRACT

A stack planter reservoir retains a volume of water to be pumped through a hydroponic system. The stack planter reservoir includes a reservoir base, a lateral wall, a lid-receiving lip, and a planter-supporting lid. The reservoir base and the later wall define a storage volume for water. The lid-receiving lip is perimetrically connected to the lateral wall to receive the planter-supporting lid. The planter-supporting lid supports a single planter or a plurality of stacking planters. The planter-supporting lid includes a pump outlet to allow fluid transport from the storage volume to the planter or plurality of stacking planters.

12 Claims, 6 Drawing Sheets

(56) References Cited

U.S. PATENT DOCUMENTS

| | | | |
|---|---|---|---|
| 9,516,821 B1* | 12/2016 | Conrad, Jr. | A01G 27/06 |
| 2006/0032128 A1* | 2/2006 | Bryan, III | A01G 31/06 47/62 R |
| 2007/0144069 A1* | 6/2007 | Gottlieb | A01G 9/023 47/82 |
| 2008/0216403 A1* | 9/2008 | Schmidt | A01G 9/023 47/83 |
| 2010/0277078 A1* | 11/2010 | Morton | A01G 7/045 315/152 |
| 2010/0287833 A1* | 11/2010 | Keats | B65D 21/043 47/81 |
| 2011/0283616 A1* | 11/2011 | Kang | A01G 9/02 47/66.7 |
| 2013/0188340 A1* | 7/2013 | Richards | F21L 4/08 362/183 |
| 2015/0128494 A1* | 5/2015 | Peterson | A01G 9/023 47/82 |
| 2016/0353674 A1* | 12/2016 | Keats | A01G 9/023 |
| 2017/0112073 A1* | 4/2017 | Jimenez Santillana | A01G 9/0295 |
| 2018/0263201 A1* | 9/2018 | Linneberg | A01G 9/022 |

* cited by examiner

STACK PLANTER RESERVOIR

The current application claims a priority to the U.S. Design patent application Ser. No. 29/551,370 filed on Jan. 13, 2016.

FIELD OF THE INVENTION

The present invention relates generally to a gardening apparatus. More specifically, the present invention relates to a reservoir to supply water to and to support stacking planters for agricultural applications.

BACKGROUND OF THE INVENTION

Agriculture is a very important aspect of society to produce food, fibers, medicine, and biofuel feedstock. Traditionally, agriculture requires a large quantity of land to produce a quality harvest. Outdoor agriculture leaves the crops susceptible to pests and the elements. Pesticides have been manufactured to destroy harmful insects to prevent the destruction of crops; however, the health effects pesticides are possibly harmful. Greenhouses assist in maintaining a microclimate and reducing the number of pests that are able to access the crops housed within the greenhouse. Greenhouses still require a large transparent structure to provide effective natural light to the crops. More recently, the technique of hydroponics has been developed to remove the soil requirement for growing plants. Hydroponic systems allow plants to be supported in trays or tubes and the trays and tubes to be stacked to reduce space. Hydroponics with artificial light allow for a reduction in space needed to grow the plants.

The present invention is a stack planter reservoir. The present invention supports a plurality of stacking planters and stores a quantity of water to be pumped into the plurality of stacking planters. The water flows through each stacking planter and back into the reservoir to be pumped back through the plurality of stacking planters. The present invention further supports at least one light source to provide artificial light for the growth of plants within the plurality of stacking planters.

DETAIL DESCRIPTIONS OF THE INVENTION

All illustrations of the drawings are for the purpose of describing selected versions of the present invention and are not intended to limit the scope of the present invention.

The present invention is a stack planter reservoir. The present invention stores a quantity of water to distribute water to planters supported by the present invention. The planters are able to be stacked on each other in order to reduce the necessary ground space to grow crops. The quantity of water is cycled up through the planters to provide water to plants contained within the planter.

Figure 1:
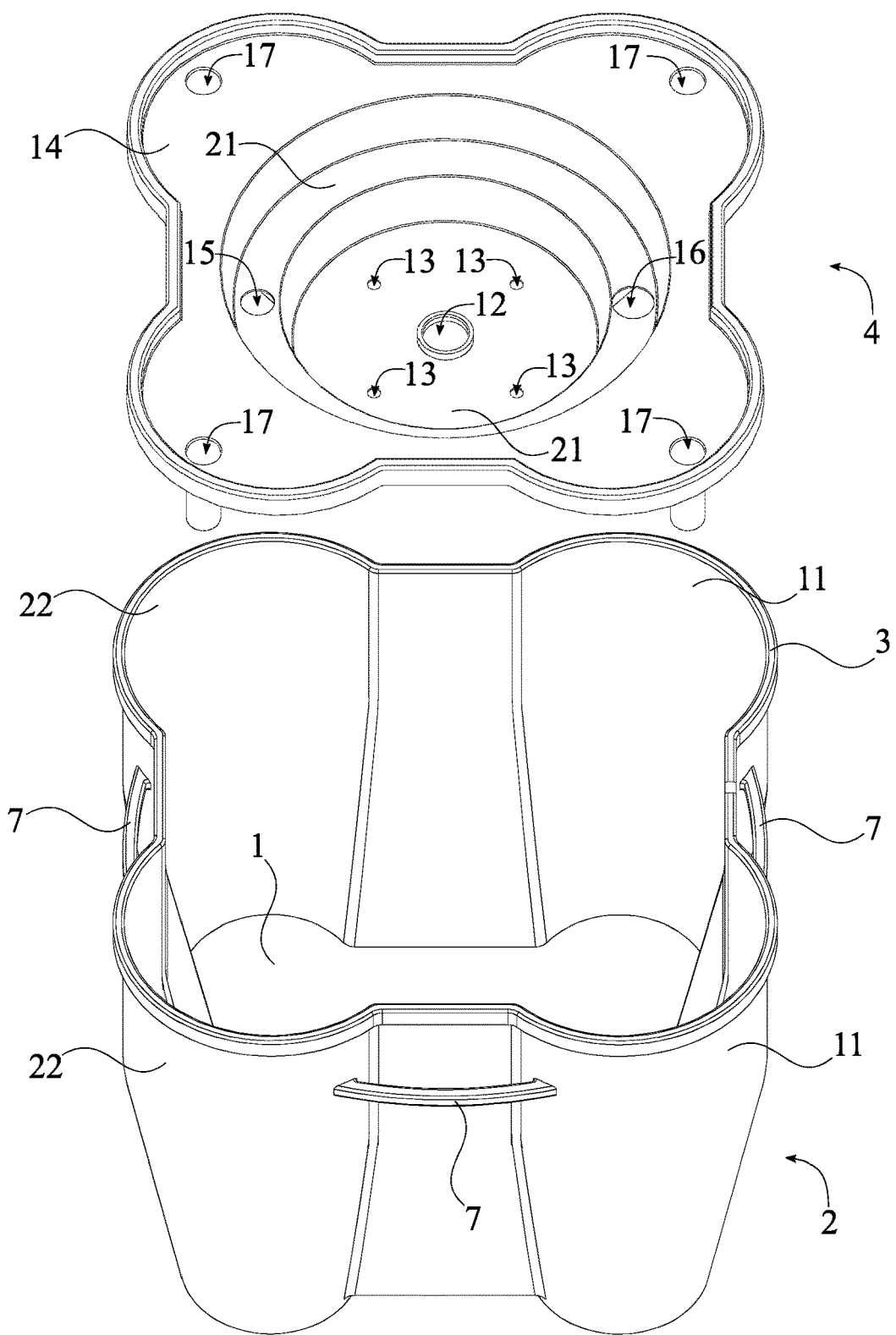
FIG. 1 is a perspective view of the present invention, detailing a reservoir base, a lateral wall, a lid-receiving lip, and a planter-supporting lid.

In accordance to FIG. 1, the present invention comprises a reservoir base 1, a lateral wall 2, a lid-receiving lip 3, and a planter-supporting lid 4. The reservoir base 1 and the lateral wall 2 allow the present invention to retain a volume of water to be cycled to a planter supported by the planter-supporting lid 3. The lateral wall 2 is perimetrically connected to the reservoir base 1, shown in FIG. 6, to define a storage volume for water. The lid-receiving lip 3 accepts and secures the planter-supporting lid 4 to the lateral wall 2. The lid-receiving lip 3 is perimetrically connected to the lateral wall 2. The lid-receiving lip 3 is oppositely positioned to the reservoir base 1, along the lateral wall 2 to receive the planter-supporting lid 4. The planter-supporting lid 4 supports a planter or series of planters above the volume of water when the present invention is implemented. The planter-supporting lid 4 selectively engages the lid-receiving lip 3. The planter-supporting lid 4 comprises a pump outlet 12, a plurality of drainage apertures 13, and a planter base 14. The pump outlet 12 allows water to be transferred through the planter-supporting lid 4 to supported planters. The pump outlet 12 traverses through the planter base 14. The planter base 14 provides a surface to support a single planter or a plurality of stacking planters. The pump outlet 12 is preferred to be centrally positioned about the planter base 14. The plurality of drainage apertures 13 allows excess water to drain from an adjacently supported planter into the volume defined by the reservoir base 1 and the lateral wall 2. The plurality of drainage apertures 13 traverses through the planter base 14. The plurality of drainage apertures 13 is radially offset from the pump outlet 12 in order to allow water to drain efficiently through the planter-supporting lid 4.

Figure 2:
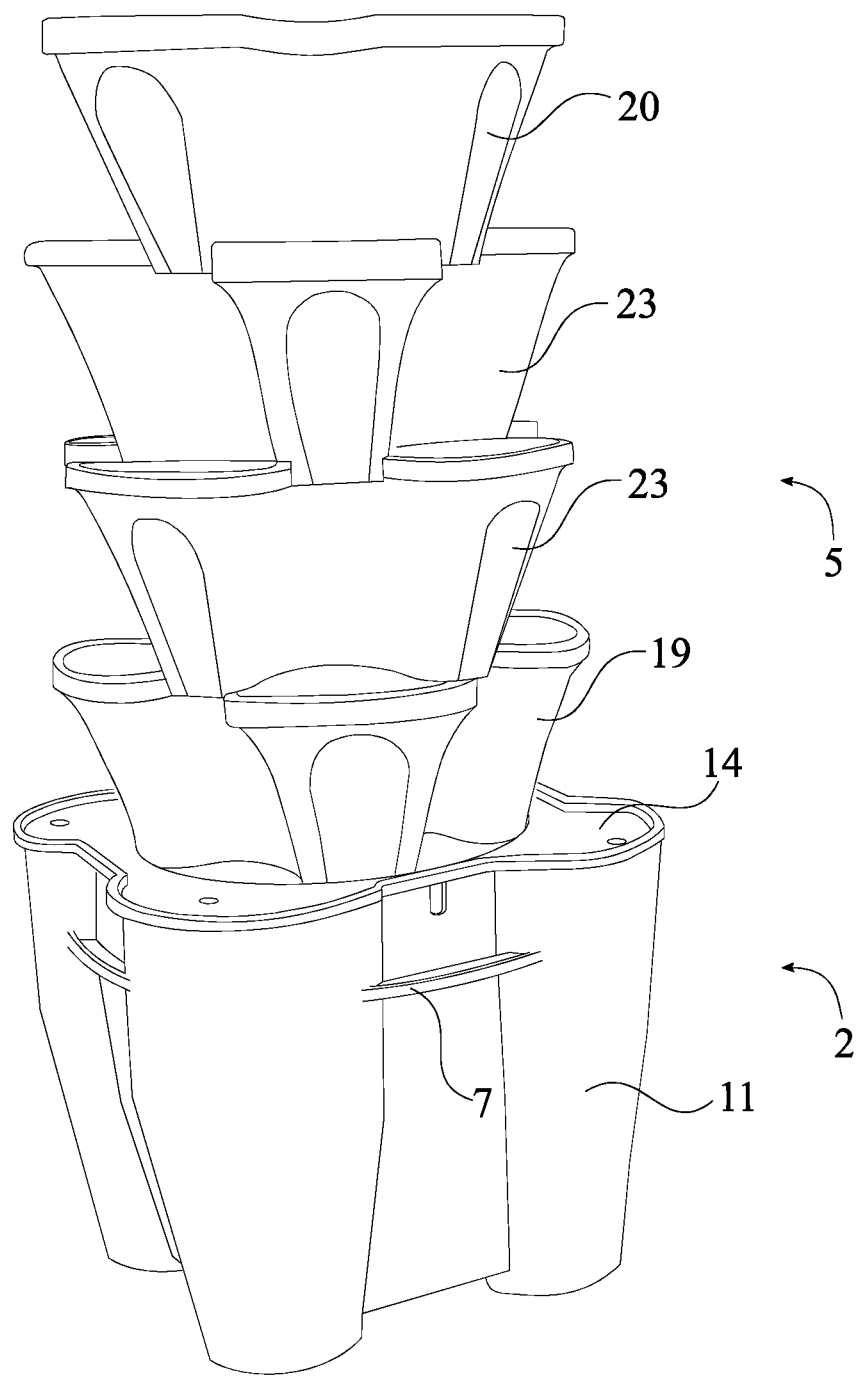
FIG. 2 is a perspective view of the present invention, including a plurality of stacking planters positioned onto the planter-supporting lid.
Figure 5:
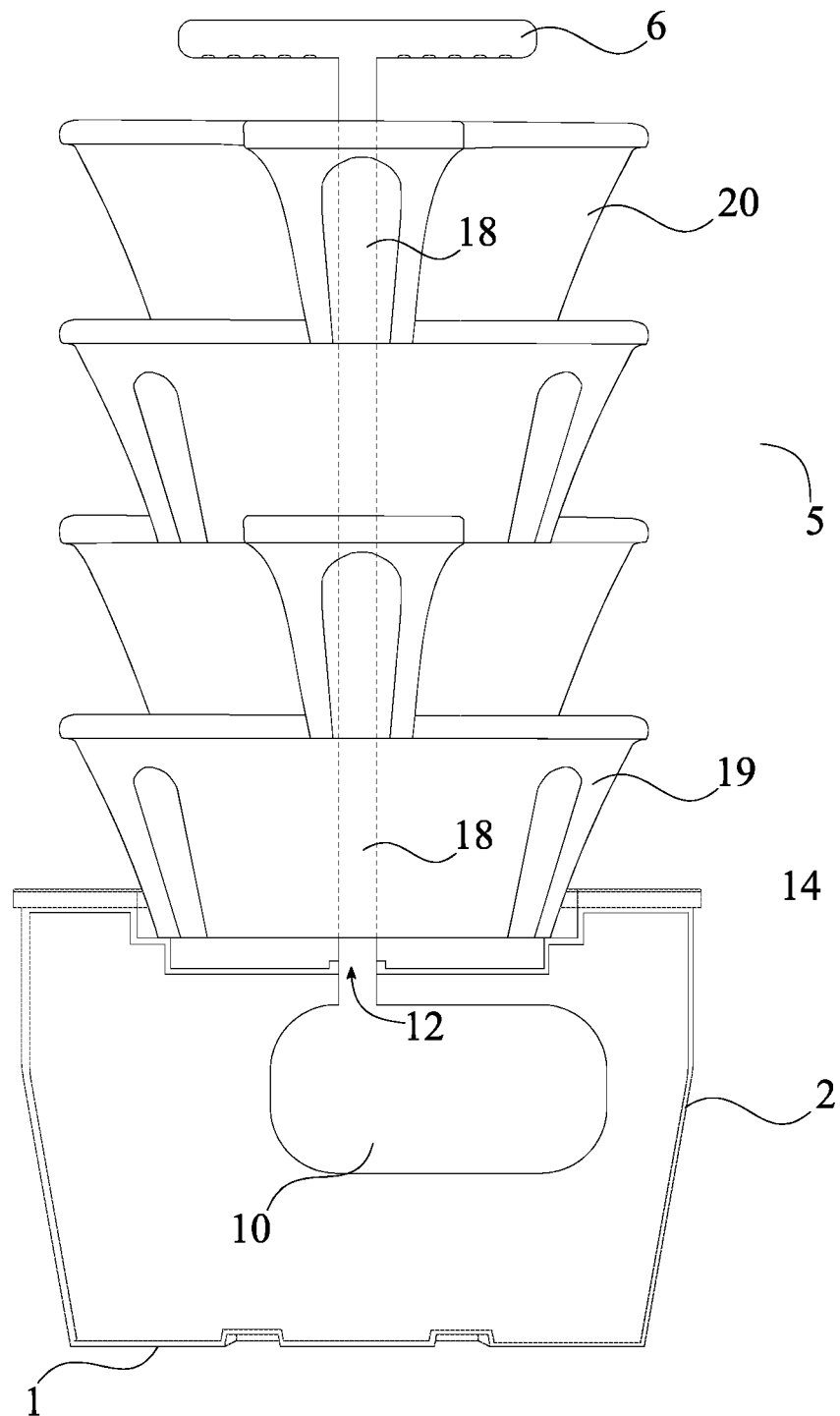
FIG. 5 is a schematic view of the present invention, detailing the fluid connections of the present invention.

In some embodiments of the present invention, the present invention comprises a plurality of stacking planters 5, detailed in FIG. 2 and FIG. 5. Each stacking planter of the plurality of stacking planters 5 supports plant life to be grown within the present invention. In accordance to FIG. 5, each stacking planter comprises a fluid transfer pipe 18 to allow water to be pumped from the storage volume through the pump outlet 12 to each stacking planter. Each stacking planter serially engages an adjacent stacking planter 23 from the plurality of stacking planters 5 to allow the plurality of stacking planters 5 to extend vertically above the planter base 14 during implementation of the present invention, shown in FIG. 2. A first stacking planter 19 of the plurality of stacking planters 5 is positioned onto the planter base 14. The fluid transfer pipe 18 of the first stacking planter 19 from the plurality of stacking planters 5 is in fluid communication with the pump outlet 12, detailed in FIG. 5. The first stacking planter 19 is positioned adjacent to the planter base 14. The fluid transfer pipe 18 of each of stacking planter is in fluid communication with one another. This configuration allows water to be transported from the storage reservoir to each stacking planter.

For a more specific embodiment of the present invention, the present invention comprises a watering manifold 6, shown in FIG. 5. The watering manifold 6 distributes water across the plurality of stacking planters 5 to provide water to each stacking planter. An ultimate stacking planter 20 from the plurality of stacking planters 5 is terminally positioned opposite to the first stacking planter 19. The watering manifold 6 engages the fluid transfer pipe 18 of the ultimate stacking planter 20. The watering manifold 6 is in fluid communication with the pump outlet 12 through each fluid transfer pipe 18. Therefore, the watering manifold 6 allows the distribution of water from the storage volume to each stacking planter.

Figure 6:
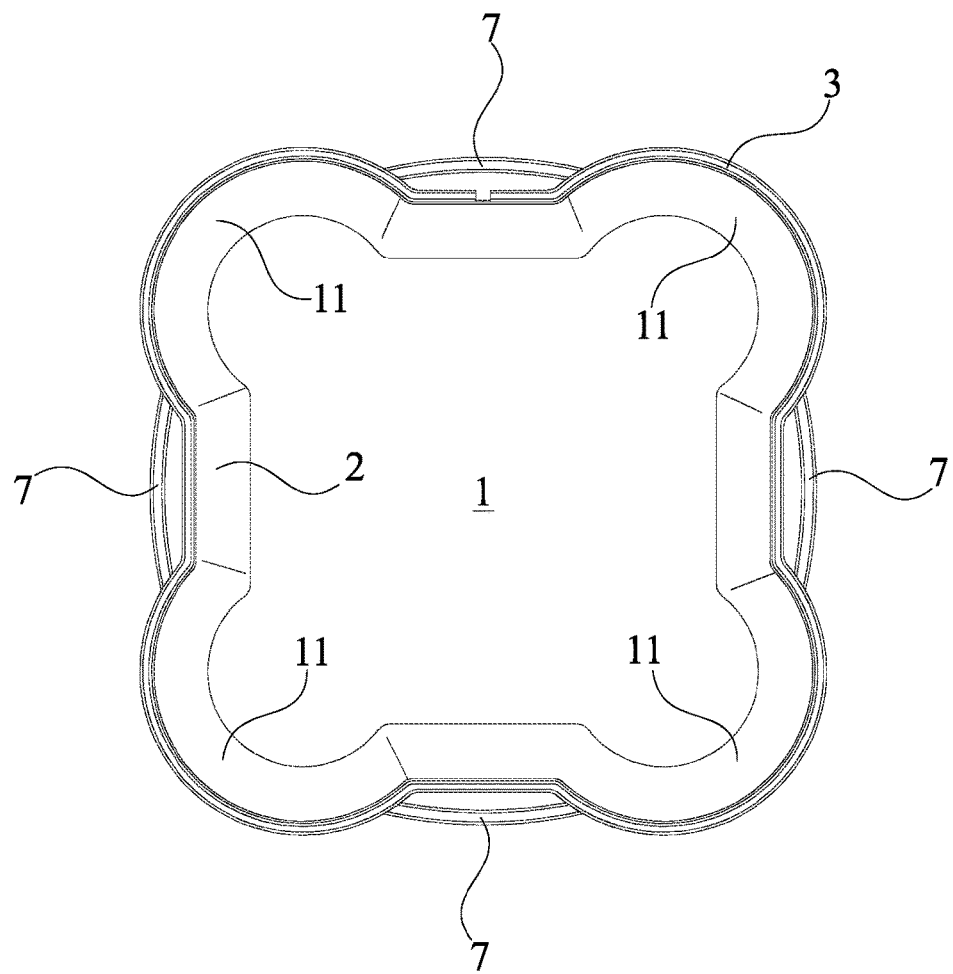
FIG. 6 is a top view of the reservoir base, the lateral wall, and the lid-receiving lip.

In accordance to the preferred embodiment of the present invention, the lateral wall 2 comprises a plurality of hemicylindrical portions 11, shown in FIG. 1, FIG. 2, and FIG. 6. The plurality of hemicylindrical portions 11 increases the volume of water that can be stored in comparison to a rectangular or circular cross-section of the lateral wall 2 with the same internal dimensions. The plurality of hemicylindrical portions 11 is radially positioned about the reservoir base 1. Each of the plurality of hemicylindrical portions 11 is evenly distributed about the reservoir base 1. The planter base 14 comprises a plurality of hemicircular portions, the plurality of hemicircular portions are radially positioned about the pump outlet 12, and the plurality of hemicircular portions are evenly distributed about the pump outlet 12.

In order to transport the present invention, the present invention comprises a plurality of handles 7, in accordance to FIG. 1. The plurality of handles 7 allows a user to easily grip the present invention for transportation. Each of plurality of handles 7 is connected to the lateral wall 2. In accordance to the preferred embodiment of the present invention, each handle is positioned between a pair of hemicylindrical portions 22 of the plurality of hemicylindrical portions 11. This configuration allows the present invention to be carried efficiently, as well as, allows the present invention to be easily separated from another of the present invention, if the present invention is nested within the other for storage.

In further accordance to the preferred embodiment of the present invention, the planter-supporting lid 4 comprises a nutrient-feed inlet 15, shown in FIG. 1. The nutrient-feed inlet 15 allows for nutrients to be introduced into the circulating water that is distributed to planters supported by the planter-supporting lid 4. The nutrient-feed inlet 15 traverses through the planter base 14. The nutrient-feed inlet 15 is offset from the pump outlet 12 in order to allow the nutrients from a nutrient rich source to become well mixed with the water within the present invention before the nutrient-water mixture is pumped to the plurality of supporting planters 5.

During implementation of the present invention the volume of water flowing through the present invention will diminish over time due to absorption by the plants or evaporation. In order to maintain a consistent volume of water within the storage volume, the planter-supporting lid 4 comprises a water inlet 16, detailed in FIG. 1. The water inlet 16 accepts plumbing fixtures to introduce water into the storage volume. The water inlet 16 traverses through the planter base 14. The water inlet 16 is offset from the pump outlet 12, such that the water from a water source is able to mix with the existing water within the storage volume to adjust the temperature or mix with nutrients for the water within the storage volume.

Figure 3:
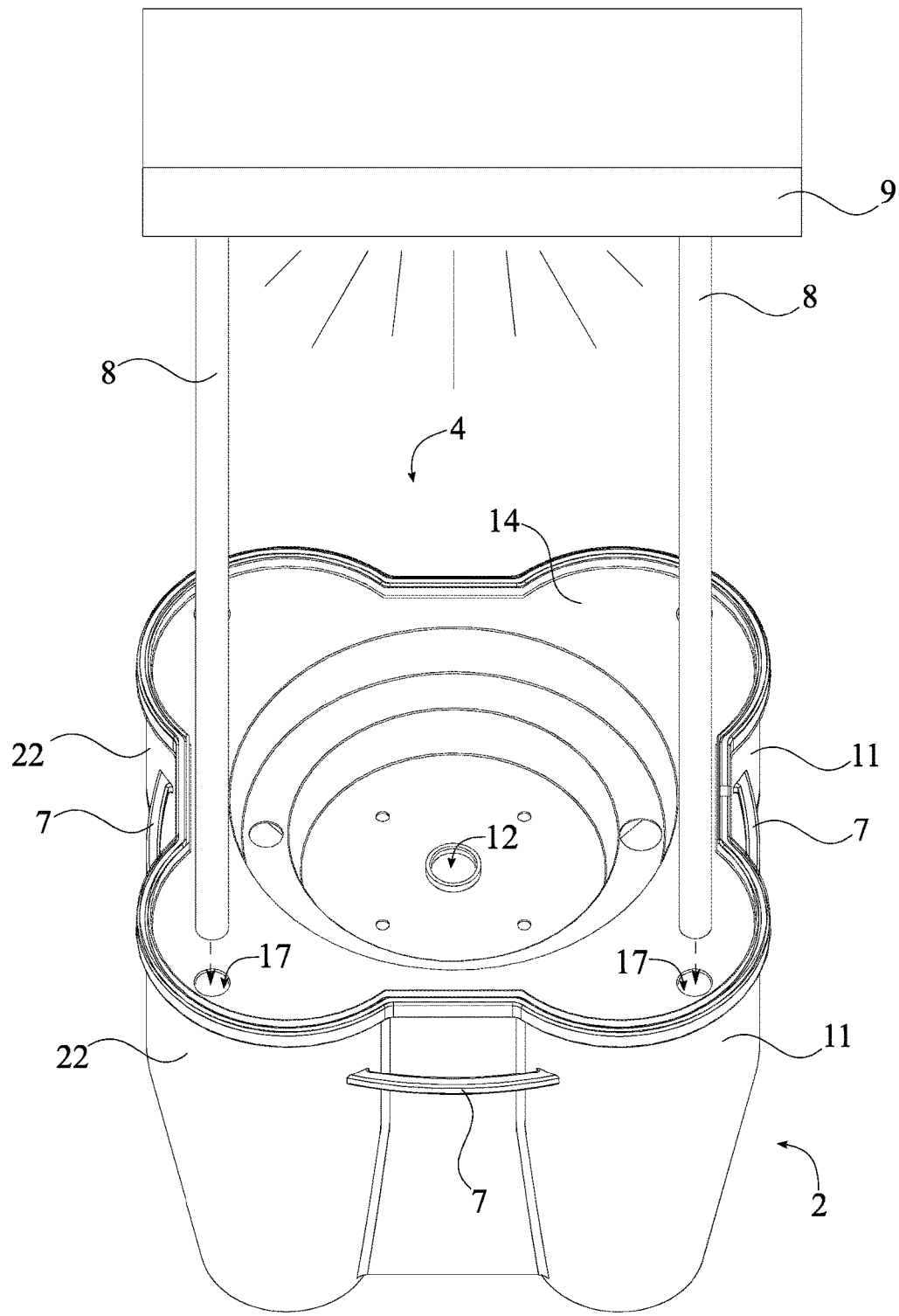
FIG. 3 is perspective view of the present invention, including a plurality of lighting supports and at least one lighting source.
Figure 4:
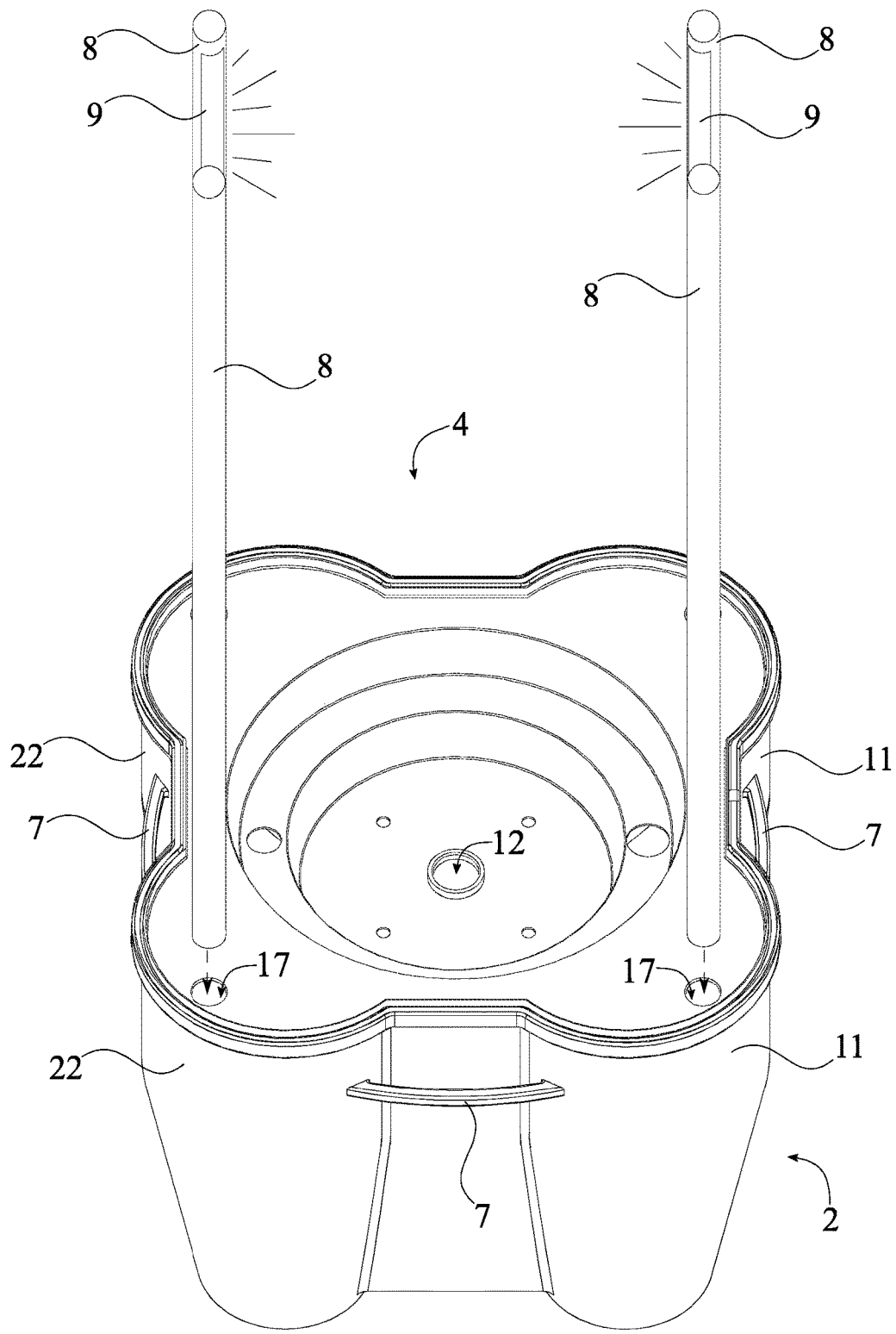
FIG. 4 is perspective view of the present invention, including an alternate embodiment for the plurality of lighting supports and the at least one lighting source.

Further in accordance to the preferred embodiment of the present invention, the planter-supporting lid 4 comprises a plurality of support-receiving apertures 17, shown in FIG. 1, FIG. 3, and FIG. 4. The plurality of support-receiving apertures 17 accepts vertical supports to suspend lighting, misting devices, or other appropriate agricultural equipment or to secure the stacking planters onto the planter base 14. The plurality of support-receiving apertures 17 traverses through the planter base 14, such that the weight of the water counterbalances the weight of the vertical supports and anything suspended by the vertical supports. The plurality of support-receiving apertures 17 is radially offset from the pump outlet 12. The plurality of support-receiving apertures 17 is evenly distributed about the planter base 14 to evenly distribute weight on the planter-supporting lid 4 or light about the stacking planters.

In order to provide light to plants within the plurality of stacking planters 5, the present invention comprises a plurality of lighting supports 8 and at least one light source 9, shown in FIG. 3 and FIG. 4. The plurality of lighting supports 8 is a set of verticals supports to support the at least one light source 9. The at least one light source 9 provides light to the plants to facilitate growth. Each of the plurality of lighting supports 8 engages a corresponding support-receiving aperture of the plurality of support-receiving apertures 17. The at least one light source 9 is adjacently connected to the plurality of lighting supports 8 such that the at least one light source 9 is optimally oriented towards the plurality of stacking planters 5. In some embodiments of the present invention, the at least one light source 9 is oppositely positioned to the planter base 14 along the plurality of lighting supports 8 to orient a light emission form the at least one light source 9 towards to the planter base 14, detailed in FIG. 3. In other embodiments of the present invention, the at least one light source 9 is positioned along at least one lighting support of the plurality of lighting supports 8, shown in FIG. 4.

Further in accordance to the preferred embodiment of the present invention, the planter base 14 comprises a plurality of base tiers 21, shown in FIG. 1. The plurality of base tiers 21 allows water to effectively drain through the planter-supporting lid 4, as well as, securing the plurality of stacking planters 5 from lateral movement. The plurality of base tiers 21 is oriented towards the reservoir base 1 to allow drainage through the planter-supporting lid 4. Each base tier of the plurality of base tiers 21 is concentrically positioned with each other to allow water to drain towards the plurality of drainage apertures 13.

In some embodiments of the present invention, the present invention comprises a submersible pump 10, detailed in FIG. 5. The submersible pump 10 is in fluid communication with the pump outlet 12 to allow fluid transport of water within the storage volume to be transported to the stacking planters through the pump outlet 12. The submersible pump 10 is positioned between the planter base 14 and the reservoir base 1 to draw water from the storage volume.

Although the invention has been explained in relation to its preferred embodiment, it is to be understood that many other possible modifications and variations can be made without departing from the spirit and scope of the invention as hereinafter claimed.

What is claimed is:

1. A stack planter reservoir comprising:
   a reservoir base;
   a lateral wall;
   a lid-receiving lip;
   a planter-supporting lid;
   the planter-supporting lid comprising a pump outlet, a plurality of drainage apertures and a planter base;
   the lateral wall being perimetrically connected to the reservoir base;
   the lid-receiving lip being perimetrically connected to the lateral wall;
   the lid-receiving lip being oppositely positioned to the reservoir base, along the lateral wall;

the planter-supporting lid selectively engaging the lid-receiving lip;
the pump outlet traversing through the planter base;
the pump outlet being centrally positioned about the planter base;
the plurality of drainage apertures traversing through the planter base;
the plurality of drainage apertures being radially offset from the pump outlet;
the lateral wall comprising a plurality of hemicylindrical portions;
the plurality of hemicylindrical portions being radially positioned about the reservoir base;
the plurality of hemicylindrical portions being evenly distributed about the reservoir base;
a plurality of handles;
the plurality of handles being externally connected to the lateral wall;
a corresponding handle among the plurality of handles being positioned in between two adjacent hemicylindrical portions among the plurality of hemicylindrical portions;
the planter base comprising a plurality of hemicircular portions;
the plurality of hemicircular portions being radially positioned about the pump outlet; and
the plurality of hemicircular portions being evenly distributed about the pump outlet.

2. The stack planter reservoir, as claimed in claim 1, comprising:
a plurality of stacking planters;
each of the plurality of stacking planters comprising a fluid transfer pipe;
two adjacent stacking planters among the plurality of stacking planters serially engaging each other;
one of the plurality of stacking planters being positioned onto the planter base;
the fluid transfer pipe of the one of the plurality of stacking planters being in fluid communication with the pump outlet; and
the two fluid transfer pipes of the two adjacent stacking planters being in fluid communication with each other.

3. The stack planter reservoir, as claimed in claim 2, comprising:
a watering manifold;
another one of the plurality of stacking planters being terminally positioned opposite to the one of the plurality of stacking planters;
the watering manifold engaging the fluid transfer pipe of the another one of the plurality of stacking planters; and
the watering manifold being in fluid communication with the pump outlet through the plurality of fluid transfer pipes.

4. The stack planter reservoir, as claimed in claim 1, comprising:
the planter-supporting lid comprising a nutrient-feed inlet;
the nutrient-feed inlet traversing through the planter base; and
the nutrient-feed inlet being offset from the pump outlet.

5. The stack planter reservoir, as claimed in claim 1, comprising:
the planter-supporting lid comprising a water inlet;
the water inlet traversing through the planter base; and
the water inlet being offset from the pump outlet.

6. The stack planter reservoir, as claimed in claim 1, comprising:
the planter-supporting lid comprising a plurality of support-receiving apertures;
the plurality of support-receiving apertures traversing through the planter base;
the plurality of support-receiving apertures being radially offset from the pump outlet; and
the plurality of support-receiving apertures being evenly distributed about the planter base.

7. The stack planter reservoir, as claimed in claim 6, comprising:
a plurality of lighting supports;
at least one light source;
a corresponding lighting support among the plurality of lighting supports engaging a corresponding support-receiving aperture among the plurality of support-receiving apertures; and
the at least one light source being connected to the plurality of lighting supports.

8. The stack planter reservoir, as claimed in claim 7, comprising:
the at least one light source being oppositely positioned to the planter base along the plurality of lighting supports.

9. The stack planter reservoir, as claimed in claim 7, comprising:
the at least one light source being positioned along at least one lighting support among the plurality of lighting supports.

10. The stack planter reservoir, as claimed in claim 1, comprising:
the planter base comprising a plurality of base tiers; and
the plurality of base tiers being oriented towards the reservoir base.

11. The stack planter reservoir, as claimed in claim 10, comprising:
the plurality of base tiers being concentrically positioned with each other.

12. The stack planter reservoir, as claimed in claim 1, comprising:
a submersible pump;
the submersible pump being in fluid communication with the pump outlet; and
the submersible pump being positioned in between the planter base and the reservoir base.

* * * * *